United States Patent
Klusener et al.

Patent Number: 5,408,031
Date of Patent: Apr. 18, 1995

[54] PREPARATION OF COPOLYMERS

[75] Inventors: Peter A. A. Klusener; Hans A. Stil, both of Amsterdam, Netherlands

[73] Assignee: Shell Oil Company, Houston, Tex.

[21] Appl. No.: 227,843

[22] Filed: Apr. 14, 1994

[30] Foreign Application Priority Data

Apr. 14, 1993 [GB] United Kingdom ................. 9307702

[51] Int. Cl.6 .............................................. C08G 67/02
[52] U.S. Cl. ...................................... 528/392; 528/271
[58] Field of Search .................................. 528/271, 392

[56] References Cited

U.S. PATENT DOCUMENTS 5,115,094   5/1992   Mastenbroek et al. ............. 528/392

Primary Examiner—John Kight, III
Assistant Examiner—Shelley A. Dodson

[57] ABSTRACT

A process for the preparation of copolymers of carbon monoxide and one or more ethylenically unsaturated non-aromatic compounds by contacting the monomers, under polymerization conditions, with a catalyst system consisting essentially of palladium, a bisphosphine ligand and a source of anions, derived from the conjugated base of acids having a pKa of less than 4, in the additional presence of a 1-alkenyl substituted arylgroup containing compound.

19 Claims, No Drawings

PREPARATION OF COPOLYMERS

BACKGROUND OF THE INVENTION

The invention relates to a process for the preparation of copolymers of carbon monoxide with one or more compounds containing an ethylenically unsaturated bond.

The preparation of linear copolymers wherein units originating from carbon monoxide substantially alternate with units originating from ethylenically unsaturated compound(s) is known from various publications in the patent literature.

A convenient preparation method is described in EP 181.014. According to this method, a mixture of carbon monoxide and an alkenically unsaturated hydrocarbon is polymerized in the presence of a catalyst, containing one of the Group VIII metals such as palladium, cobalt or nickel; an anion of a carboxylic acid with a pKa lower than 2 and a bidentate ligand containing two phosphorus, arsenic or antimony atoms.

The copolymers prepared according to this method and similar preparation procedures, have relatively high molecular weights and exhibit attractive mechanical properties. They are suitable to be used as thermoplastics for many outlets, such as films, fibers and sheets, and shaped articles e.g. tubes, containers and car parts, and for applications in the domestic sphere.

For obtaining copolymers with optimal properties for the intended uses, it is generally preferred that variations in the average molecular weight of the copolymers produced are kept to a minimum. It would therefore be advantageous to perform the copolymerization under such conditions that the average molecular weight of the obtained product can be controlled during the process and substantially maintained at the desired value. The average molecular weight of the copolymers, calculated as number average ($M_n$), typically is 10,000 or more.

The higher the molecular weight, the higher will be in general the intrinsic viscosity of the copolymers.

The intrinsic viscosity can be determined by dissolving the copolymers in m-cresol in different concentrations and measuring the viscosity of each solution at 60° C. From the relative viscosities the inherent viscosities can be calculated and by extrapolating to a concentration of zero, the intrinsic viscosity in dL/g can be found. Instead of "intrinsic viscosity" the term limiting viscosity number (LVN) is used. The copolymers typically have an LVN of between 0.8 and 2.0 dn/g.

In addition to the aforesaid copolymers, oligomers of carbon monoxide and ethylenically unsaturated compounds may be prepared. Furthermore copolymers of these monomers having a considerably lower LVN than the above mentioned thermoplastic copolymers, e.g. in the range of from 0.2 to 0.6 dL/g, have properties which make them useful for other applications than the indicated outlets for thermoplastic products.

They may be used as such, or as starting materials for the preparation of plastics, as blending components or as plasticizers for other polymers. It would therefore also be advantageous, if the copolymerization process could be performed under such conditions that these products with lower average molecular weights, e.g. of 3000 or less, are the predominant reaction product.

In order to produce such lower average molecular weight copolymer, it has been proposed to increase the temperature at which the copolymerization is carried out. Although the formation of products with lower LVN's is thus enhanced, the stability of the catalyst system often becomes a problem.

It has further been proposed to reduce the molecular weight of the produced copolymers by addition of molecular hydrogen during the reaction. It appears that with most catalyst systems recommended for this process, a significant reduction in molecular weight only occurs by applying large amounts of hydrogen, say from 60 mol % or more, based on carbon monoxide. Apart from the unattractiveness of a high consumption of hydrogen, the use of large quantities of this gas often results in a reduction of the Group VIII metal component of the catalyst system, accompanied by a substantial inactivation thereof. Only in exceptional cases, by selecting specific ligands for the catalyst system, the intended reduction in molecular weight of the copolymers can be achieved, without impairing the catalytic activity of the system.

According to patent application (T-1862), i.e. U.S. Ser. No. 150,934 filed on Nov. 10, 1993, an adequate control of the average molecular weight of the formed copolymers is achieved and, if desired, products having relatively low molecular weights can be produced, by carrying out the copolymerization reaction in the presence of a minor amount of a compound containing a hydride moiety.

SUMMARY OF THE INVENTION

It has now been found that these aims can also be achieved by using a catalyst system, consisting essentially of palladium and a bidentate bisphosphine ligand in the additional presence of a compound containing a 1-alkenyl substituted arylgroup.

The invention may be defined as relating to a process for the preparation of copolymers of carbon monoxide and one or more ethylenically unsaturated non-aromatic compounds by contacting the monomers, under polymerization conditions with a catalyst system consisting essentially of palladium, a bisphosphine ligand and a source of anions, derived from the conjugated base of acids having a pKa of less than 4, in the additional presence of a 1-alkenyl substituted arylgroup containing compound, hereinafter sometimes referred to as compound A.

DETAILED DESCRIPTION OF THE INVENTION

The amount of compound A may vary within a relatively wide range. Depending on the prevailing copolymerization conditions, the optimal amount of compound A can be readily selected by those skilled in the art.

Based on the amount of palladium in the catalyst system the quantity of compound A is usually in the range of from $10^1$ to $10^7$ moles per gram atom of palladium, preferably in the range of from $10^2$ to $10^6$ on the same basis.

Based on the non-aromatic ethylenically unsaturated compound(s), the amount of compound A may be substantially equimolar or even in excess.

Without wishing to be bound by any theoretical explanation of the reaction mechanism, it is considered likely that during the copolymerization reaction a molecule of compound A combines with the catalyst thus preventing another molecule of the ethylenically unsaturated compound from reacting with the catalyst. The growth of the chain of the copolymer molecule is thereby interrupted and one of the endgroups of the resulting reaction product will be derived from compound A.

Compound A can be any compound containing a 1-alkenyl substituted arylgroup, such as 1-alkenylbenzenes, 1-alkenylindenes, 1-alkenylnaphthalenes and 1-alkenylanthracenes. Suitable examples include vinylbenzenes, 1-propenylbenzenes, 1-butenylbenzenes and vinylnaphthalenes. Preferably, compound A is a vinyl-substituted aromatic compound, more preferably a vinyl benzene.

The arylgroup of compound A may be substituted by one or more, usually non-bulky substituents. Suitable substituents include halogen atoms, such as fluorine, chlorine and bromine atoms; alkoxygroups having from 1 to 4 carbon atoms; and hydrocarbyl groups, in particular alkyl groups having from 1 to 4 carbon atoms. Two hydrocarbyl substituents linked to adjacent ring carbon atoms of the aryl group may, together with the said ring atoms, form a cyclic structure.

Examples of suitable compounds A are p-chlorostyrene, p-methoxystyrene and p-methylstyrene.

If desired, compound A may be supplied to the reactor separately, or together with any of the other reactants or with the catalyst system. Preferably, compound A is added in portions or continuously during the copolymerization reaction, as this facilitates the control of the molecular weight of the final reaction product.

In the catalyst systems used in the process of the invention, palladium is substantially present as palladium cations. Conveniently, palladium is introduced in the form of a palladium-salt, e.g. a salt of a mineral acid such as sulphuric acid or nitric acid or of a sulfonic acid such as methylsulfonic acid or p-toluenesulfonic acid. Preferably, a palladium salt of a carboxylic acid is used, e.g. of a carboxylic acid having from 2 to 6 carbon atoms. A preferred palladium-carboxylate is palladium (II) acetate.

The catalyst system further comprises a bisphosphine ligand, whereby two phosphorus atoms can form a complexing bond with palladium. It is believed that the stability of the catalyst system is significantly enhanced by the presence of these two complexing sites.

Preferred bisphosphine ligands may be represented by the formula

$$R^1R^2PRPR^3R^4 \qquad (I)$$

wherein each of $R^1$, $R^2$, $R^3$ and $R^4$ independently represents a substituted or non-substituted hydrocarbyl group and R represents a bivalent, organic bridging group containing at least two atoms in the bridge.

$R^1$, $R^2$, $R^3$ and $R^4$ may independently represent optionally substituted aryl, alkaryl, aralkyl or alkyl groups. Preferably they represent aryl groups optionally substituted with one or more polar substituents. Suitable substituents may be selected from the group consisting of halogen atoms, alkoxy groups and (alkyl) amino groups. Preferably at least one of $R^1$, $R^2$, $R^3$ and $R^4$ represents a phenyl group substituted at one or both ortho positions with respect to the phosphorus atom to which the phenyl group is linked, by an alkoxy-group, having 1 to 4 carbon atoms, in particular a methoxy or ethoxy group.

Ligands in which $R^1$, $R^2$, $R^3$ and $R^4$ have the same meaning, are preferred, because their preparation is less complicated than that of bisphosphines wherein $R^1$, $R^2$, $R^3$ and $R^4$ are different.

The bivalent organic group, preferably contains from 2 to 4 atoms in the bridge, at least two of which are carbon atoms. Examples of suitable bridging groups are: —$CH_2$—$CH_2$—; —$CH_2$—$CH_2$—$CH_2$—; —$CH_2$—$CH_2$—$CH_2$—$CH_2$—; $CH_2$—O—$CH_2$—; $Si(CH_3)_2$—$CH_2$— and —$CH_2$—$C(CH_3)_2$—$CH_2$—.

The catalyst systems of the invention moreover comprise a source of anions, derived from the conjugated base of acids having a pKa of less than 4, preferably less than 2.

Examples of suitable acids are mineral acids such as perchloric acid and tetrafluoroboric acid, and sulfonic acids, such as p-toluenesulfonic acid, methanesulfonic acid and trifluoromethanesulfonic acid.

The amount of catalyst used in the process of the invention may vary considerably. Advantageously the catalyst is applied in an amount in the range of from $10^{-7}$ to $10^{-1}$ gram atoms of palladium per mole of non-aromatic ethylenically unsaturated compound. Preferably this amount is in the range of from $10^{-6}$ to $10^{-2}$ gram atoms of palladium per mole of ethylenically unsaturated compound.

The monomers useful in the practice of this invention are carbon monoxide and one or more non-aromatic ethylenically unsaturated compounds. Preferably the latter are hydrocarbons, in particular alkenes having from 2 to 12 carbon atoms per molecule. Examples are ethene, propene, octene-1, cyclopentene and decene-1.

If desired, monomers, which in addition to carbon and hydrogen atoms, comprise heteroatoms, such as oxygen or nitrogen atoms may be used as well. If a single non-aromatic, ethylenically unsaturated compound is reacted with carbon monoxide, copolymers are formed in the chains of which two alternating groups occur. In order to modify the properties of the polymeric product, terpolymers may be prepared whereby carbon monoxide is copolymerized with two different ethylenically unsaturated compounds ($X_1$ and $X_2$). With non-aromatic ethylenically unsaturated compounds, terpolymers are formed whereby the polymer chain is composed of groups —CO—$X_1'$— and groups —CO—$X_2'$— which are randomly distributed over the chain, $X_1'$ and $X_2'$ being bivalent moieties derived from the ethylenically unsaturated compounds $X_1$ and $X_2$, respectively. Additional information relating to this aspect of the invention can be found in U.S. Pat. No 4,880,903 which is herein incorporated by reference.

It has been established that for preparing terpolymers, whereby one of the organic monomers contains aromatic unsaturation, special measures are required such as the use of catalyst systems containing ligands other than bisphosphines.

In the process of the invention, preferred starting materials are lower mono olefins, in particular ethene, and mixtures thereof, in particular a mixture of ethene and propene.

The molar ratio between the monomers, i.e. carbon monoxide and ethylenically unsaturated non-aromatic compound(s), is usually in the range of from 1:5 to 5:1. Preferably the molar ratio is in the range of from 1:1.5 to 1.5:1, with substantially equimolar ratios being most preferred.

The process of the invention is conveniently carried out in the presence of a liquid diluent. A polar as well as non-polar diluents are suitable. Examples of such diluents include pentane and acetone. Protic diluents are preferred, for example lower alcohols having from 1 to 5 carbon atoms such as methanol or 1-butanol.

The temperature at which the copolymerization reaction is carried out, is generally in the range of from 30° to 170° C. Preferably the temperature is in the range of from 60° to 130° C.

Suitable reaction pressures are within the range of from 2 to 150 bar, although pressures outside this range can also be used. Preferably the pressure is in the range of from 5 to 100 bar.

The invention is further illustrated by the following non-limiting examples.

EXAMPLE I

A copolymer of carbon monoxide and ethene was prepared as follows:

A 250 mL mechanically stirred reactor was charged with 150 mL of methanol and 61.25 mmol of styrene. In order to remove the air, the autoclave was pressurized with a equimolar ethene/carbon monoxide mixture to 40 bar, whereupon the pressure was released. This procedure was repeated twice. Subsequently, the temperature was raised to 95° C. and an equimolar mixture of ethene and carbon monoxide was supplied until the pressure was 55 bar. Finally, a catalyst solution was added consisting of 0.0123 mmol of palladium (II) acetate, 0.0130 mmol of 1,3-bis(diphenylphosphino)propane and 0.0379 mmol of p-toluenesulfonic acid in 4 mL of acetone.

After a reaction period of 1.02 hrs. the polymerization was terminated by cooling the reactor contents to ambient temperature and by releasing the pressure. The product was filtered off, washed twice with methanol and once with acetone and dried in vacuo at 50° C.

10.7 g of polymer was obtained, the average polymerization rate being 8.0 kg product per g of palladium per hour. The average molecular weight determined by end-group analysis using $^{13}C$ NMR spectrometry was 3100. The end-group analysis showed that ethyl, methyl, ester, styryl and phenethyl end-groups had been formed.

The reaction conditions and results are shown in the Table.

EXAMPLE II

A copolymer of carbon monoxide and ethene was prepared, substantially as described in Example I with the following differences:
i) 61.44 mmoles of 4-methylstyrene was used, instead of 61.25 mmoles of styrene;
ii) the reaction period was 1.03 hours instead of 1.02 hours.

The results are shown in the Table.

EXAMPLE III

A copolymer of carbon monoxide and ethene was prepared, substantially as described in Example I with the following differences:

i) 61.49 mmoles of 4-methoxystyrene was used, instead of 61.25 mmoles of styrene;
ii) the reaction period was 1.05 hours, instead of 1.02 hours.

The results are shown in the Table.

EXAMPLE IV

A copolymer of carbon monoxide and ethene was prepared, substantially as described in Example I, with the following differences:
i) 61.2 mmoles of 4-fluorostyrene was used, instead of 61.25 mmoles of styrene;
ii) 0.0122 mmoles of palladium (II) acetate was used, instead of 0.0123 mmoles;
iii) the amount of p-toluenesulfonic acid was 0.0277 mmoles instead of 0.0278 mmoles.
iv) the reaction period was 1.07 hours, instead of 1.02 hours.

The results are shown in the Table.

EXAMPLE V

A copolymer of carbon monoxide and ethene was prepared, substantially as described in Example IV, with the following differences:
i) 61.19 mmoles of 4-bromostyrene was used, instead of 61.2 mmoles of 4-fluorostyrene;
ii) the reaction period was 0.97 hours, instead of 1.07 hours.

The results are shown in the Table.

EXAMPLE VI

A copolymer of carbon monoxide and ethene was prepared, substantially as described in Example I, with the following differences:
i) 32.5 mmoles of 2-vinylnaphthalene was used, instead of 61.25 mmoles of styrene;
ii) 154 mL of methanol, instead of 150 mL was used;
iii) 0.0189 mmoles of palladium (II) acetate was used, instead of 0.0123 mmoles;
iv) 0.0203 mmoles of 1,3-bis(diphenylphosphino)propane was used, instead of 0.0130 mmoles;
v) the amount of p-toluenesulfonic acid was 0.0444 mmoles, instead of 0.0279 mmoles;
vi) the reaction period was 8.10 hours, instead of 1.02 hours.

The results are shown in the Table.

EXAMPLE A (For comparison, not according to the invention)

A copolymer of carbon monoxide and ethene was prepared, substantially as described in Example I, with the following differences:
i) no 1-alkenylaryl compound was added;
ii) the reaction period was 0.95 hours, instead of 1.02 hours.

The results are shown in the Table.

TABLE

| Example No. | 1-Alkenylaryl compound | Reaction time (hrs) | Yield (g) | Rate (Kg/g Pd. h) | Degree of Polymerization | Aver. mol. weight ($M_n$) |
| --- | --- | --- | --- | --- | --- | --- |
| I | styrene | 1.02 | 10.7 | 8.0 | 54 | 3100 |
| id (duplo) | " | 1.03?? | 11.18 | 8.3 | 46 | 2600 |
| II | 4-methylstyrene | 1.03 | 6.64 | 4.9 | 42 | 2400 |
| id (duplo) | " | 1.02?? | 5.33 | 4.0 | 40 | 2300 |
| III | 4-methoxystyrene | 1.05 | 5.19 | 3.8 | 42 | 2400 |
| id (duplo) | " | 1.05 | 5.58 | 4.1 | 43 | 2500 |
| IV | 4-fluorostyrene | 1.07 | 13.55 | 9.7 | 48 | 2700 |

TABLE-continued

| Example No. | 1-Alkenylaryl compound | Reaction time (hrs) | Yield (g) | Rate (Kg/g Pd. h) | Degree of Polymerization | Aver. mol. weight ($M_n$) |
|---|---|---|---|---|---|---|
| id (duplo) | " | 1.07 | 11.99 | 8.6 | 64 | 3600 |
| V | 4-bromostyrene | 0.97 | 5.86 | 4.6 | 52 | 3000 |
| id (duplo) | " | 1.12?? | 9.98 | 6.8 | 77 | 4400 |
| VI | 2-vinylnaphthalene | 8.10 | 3.20 | 0.2 | 53 | 3000 |
| A | — | 0.95 | 12.99 | 10.4 | 100 | 5600 |

While this invention has been described in detail for the purpose of illustration, it is not to be construed as limited thereby but is intended to cover all changes and modifications within the spirit and scope thereof.

We claim:

1. A process for the preparation of polymers of carbon monoxide and one or more ethylenically unsaturated nonaromatic compounds by contacting the monomers, under polymerization conditions, with a catalyst system consisting essentially of palladium, a bisphosphine ligand and a source of anions, derived from the conjugated base of acids having a pKa of less than 4, in the additional presence of from about $10^1$ to $10^7$ moles of a 1-alkenyl substituted aryl group containing compound (compound A) per gram atom of palladium, wherein said arylgroup is substituted by one or more members of the group consisting of halogens, hydrocarbyl, and alkoxy groups.

2. A process as in claim 1 wherein compound A is a vinyl substituted aromatic compound.

3. A process as in claim 2 wherein compound A is a vinyl benzene.

4. A process as in claim 3 wherein said vinyl benzene is substituted with one or more substituents selected from the group consisting of halogen atoms, alkyl groups with 1–4 carbon atoms and alkoxy groups with 1–4 carbon atoms.

5. A process as in claim 4 wherein said substituent is a chlorine atom or a methoxy group.

6. A process as in claim 1 wherein said palladium is present as a palladium salt of a carboxylic acid.

7. A process as in claim 6 wherein said palladium salt is palladium (II) acetate.

8. A process as in claim 1 wherein said catalyst system comprises a bisphosphine ligand of the formula

$$R^1R^2PRPR^3R^4 \quad (I)$$

wherein each of $R^1$, $R^2$, $R^3$, and $R^4$ independently represents a substituted or non-substituted hydrocarbyl group and R represents a bivalent organic bridging group containing at least two atoms in the bridge.

9. A process as in claim 8 wherein said bisphosphine ligand of formula (I), $R^1$, $R^2$, $R^3$, and $R^4$ independently represent substituted or non-substituted arylgroups and R represents a bivalent organic bridging group containing from 2 to 4 bridging atoms, at least two of which are carbon atoms.

10. A process as in claim 9 wherein said bisphosphine ligand of formula (I) at least one of $R^1$, $R^2$, $R^3$, and $R^4$ represents a phenyl group substituted by a polar group, in particular an alkoxy group with 1 or 2 carbon atoms, at one or both ortho positions with respect to the phosphorus atom to which the phenyl group is linked.

11. A process as in claim 8 wherein in said bisphosphine ligand of formula (I), $R^1$, $R^2$, $R^3$ and $R^4$ represent the same groups.

12. A process as in claim 1 wherein said catalyst system comprises a source of anions, derived from the conjugated base of acids having a pKa of less than 2.

13. A process as in claim 12 wherein said acid is para-toluenesulfonic acid.

14. A process as in claim 1 wherein per mole of ethylenically unsaturated compound to be copolymerized, palladium is present in the catalyst system in an amount of from about $10^{-7}$ to $10^{-1}$ gram atoms.

15. A process as in claim 1 wherein said non-aromatic ethylenically unsaturated compounds are olefins having from 2 to 8 carbon atoms.

16. A process as in claim 1 wherein the molar ratio of carbon monoxide to the non-aromatic ethylenically unsaturated compound(s) is in the range from about 1.5:1 to 1:1.5.

17. A process as in claim 1 wherein said copolymers are prepared in the presence of a liquid diluent.

18. A process as in claim 1 wherein said contacting occurs at a temperature in the range of from 60° to 130° C. and at a pressure in the range of from 5 to 100 bars.

19. An article of manufacture prepared from the copolymer of claim 1.

* * * * *